(12) United States Patent
Ho et al.

(10) Patent No.: US 8,551,285 B2
(45) Date of Patent: *Oct. 8, 2013

(54) METHOD OF MAKING MULTILAYER POLYURETHANE PROTECTIVE FILM

(75) Inventors: Charlie C. Ho, Woodbury, MN (US); Kenneth J. Halford, Woodbury, MN (US); Michael A. Johnson, Stillwater, MN (US); Bryan C. Feisel, Hudson, WI (US); Eugene C. Ostertag, Afton, MN (US); Robert D. Taylor, Stacy, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,131

(22) Filed: Jan. 26, 2012

(65) Prior Publication Data

US 2012/0160402 A1  Jun. 28, 2012

Related U.S. Application Data

(63) Continuation of application No. 12/443,871, filed as application No. PCT/US2007/080146 on Oct. 2, 2007, now Pat. No. 8,128,779.

(60) Provisional application No. 60/828,106, filed on Oct. 4, 2006.

(51) Int. Cl.
| | |
|---|---|
| *B29C 65/00* | (2006.01) |
| *B31B 1/60* | (2006.01) |
| *B32B 37/00* | (2006.01) |
| *B32B 38/14* | (2006.01) |
| *B32B 27/36* | (2006.01) |
| *C04B 37/00* | (2006.01) |

(52) U.S. Cl.
USPC .............. 156/325; 156/60; 156/277; 428/412

(58) Field of Classification Search
USPC .................................. 156/60, 277; 428/412
See application file for complete search history.

(56) References Cited

U.S. PATENT DOCUMENTS

| | | | |
|---|---|---|---|
| 3,728,182 | A | 4/1973 | Wisotzky et al. |
| 4,597,927 | A | 7/1986 | Zeitler et al. |
| 4,948,859 | A | 8/1990 | Echols et al. |

(Continued)

FOREIGN PATENT DOCUMENTS

| | | |
|---|---|---|
| CN | 1484582 | 3/2004 |
| JP | 2001-187362 | 7/2001 |

(Continued)

OTHER PUBLICATIONS

ASTM D 2244-05 "Standard Practice for Calculation of Color Tolerances and Color Differences from Instrumentally Measured Color Coordinates", 2005, pp. 1-10.

(Continued)

*Primary Examiner* — Michael Orlando
(74) *Attorney, Agent, or Firm* — Bradford B. Wright

(57) ABSTRACT

A method of making a multilayer protective film. The method comprises: (a) forming a PU layer comprising an at least partially crosslinked polyurethane, the at least partially crosslinked polyurethane comprising at least one of a polyester-based polyurethane or a polycarbonate-based polyurethane; (b) forming a TPU layer comprising a polycaprolactone-based thermoplastic polyurethane; (c) forming a PSA layer comprising a pressure sensitive adhesive; (d) bonding one major surface of the PU layer to one major surface of the TPU layer; and (e) bonding the PSA layer to an opposite major surface of the TPU layer; wherein the TPU layer is sandwiched between the PU layer and the PSA layer. The multilayer film may be used to protect painted surfaces of vehicle body parts.

27 Claims, 2 Drawing Sheets

(56) References Cited

U.S. PATENT DOCUMENTS

| | | | |
|---|---|---|---|
| 5,405,675 | A | 4/1995 | Sawka et al. |
| 5,468,532 | A | 11/1995 | Ho et al. |
| 6,383,644 | B2 | 5/2002 | Fuchs |
| 6,521,145 | B1 | 2/2003 | Engler et al. |
| 6,534,617 | B1 | 3/2003 | Batt et al. |
| 6,607,831 | B2 | 8/2003 | Ho et al. |
| 6,676,754 | B1 | 1/2004 | Fleming et al. |
| 8,128,779 | B2 | 3/2012 | Ho et al. |
| 2002/0146568 | A1 | 10/2002 | Ho et al. |
| 2004/0224101 | A1 | 11/2004 | Johnson |
| 2004/0234771 | A1 | 11/2004 | Meyer et al. |
| 2008/0199704 | A1 | 8/2008 | Ho et al. |
| 2008/0311349 | A1 | 12/2008 | Johnson et al. |

FOREIGN PATENT DOCUMENTS

| | | |
|---|---|---|
| JP | 2003-001648 | 1/2003 |
| WO | WO 93/24551 | 12/1993 |
| WO | WO 94/29127 | 12/1994 |
| WO | WO 00/51799 | 9/2000 |
| WO | WO 02/053379 | 7/2002 |
| WO | WO 2006/102581 | 9/2006 |
| WO | WO 2006/102592 | 9/2006 |
| WO | WO 2006/118883 | 11/2006 |
| WO | WO 2008/039658 | 4/2008 |
| WO | WO 2008/039659 | 4/2008 |
| WO | WO 2008/042883 | 4/2008 |

OTHER PUBLICATIONS

ASTM D 3170-03 "Standard Test Method for Chipping Resistance of Coatings", 2003, pp. 1-7.

ASTM D 2244-05 "Standard Practice for Calculation of Color Tolerances and Color Differences from Instrumentally Measured Color Coordinates", Nov. 2005, pp. 1-10.

ASTM D 3170-03 "Standard Test Method for Chipping Resistance of Coatings", Sep. 2003, pp. 1-7.

METHOD OF MAKING MULTILAYER POLYURETHANE PROTECTIVE FILM

CROSS-REFERENCE TO RELATED CASES

This application is a continuation of application Ser. No. 12/443,871, filed Oct. 2, 2007, which is a national stage filing under 35 U.S.C. 371 of International Application No. PCT/US2007/080146, filed Oct. 2, 2007, which claims priority to U.S. Provisional Application Ser. No. 60/828,106, filed Oct. 4, 2006.

BACKGROUND

Multilayer films that include one or more layers of a polyurethane material are known. Some of these films are disclosed in U.S. Pat. No. 6,607,831 (Ho); U.S. Pat. No. 5,405,675 (Sawka et al.); U.S. Pat. No. 5,468,532 (Ho et al.); U.S. Pat. No. 6,383,644 (Fuchs); as well as PCT Internat. Publ. No. WO 93/24551 A1 (Pears et al.). Some of these films have been used in surface protection applications. For example, actual film products that have been used to protect the painted surface of selected automobile body parts include multilayer films manufactured for years by 3M Company, St. Paul, Minn., under the trade designations SCOTCHCAL high performance protective film PUL0612, PUL1212 and PUL1212DC. Each of these 3M Company film products includes a thermoplastic polyester-based polyurethane layer that is backed by a pressure sensitive adhesive (PSA) on one major surface and covered by a water-based polyester-based or polycarbonate-based polyurethane layer on the opposite major surface.

SUMMARY

In one aspect, the present invention provides a method of making a multilayer protective film, the method comprising steps:

(a) forming a PU layer comprising an at least partially crosslinked polyurethane, the at least partially crosslinked polyurethane comprising at least one of a polyester-based polyurethane or a polycarbonate-based polyurethane;

(b) forming a TPU layer comprising a polycaprolactone-based thermoplastic polyurethane;

(c) forming a PSA layer comprising a pressure sensitive adhesive;

(d) bonding one major surface of the PU layer to one major surface of the TPU layer; and (e) bonding the PSA layer to an opposite major surface of the TPU layer; wherein the TPU layer is sandwiched between the PU layer and the PSA layer, and wherein at least one of steps (a) or (b) comprises step:
(i) forming a rolling bank of a polyurethane precursor material comprising at least one polyisocyanate and at least one polyol, wherein the rolling bank contacts first and second substrates;
passing the first and second substrates with the polyurethane precursor material disposed therebetween through a nip;
heating the polyurethane precursor material under conditions such that it forms the PU layer or the TPU layer in contact with the first and second substrates; and
optionally removing at least one of the first or second substrates from the PU layer or the TPU layer to expose an outer surface of the PU layer or the TPU layer, respectively; or step (b) comprises step:
(ii) introducing components comprising a diisocyanate and a diol into an extruder to provide a molten thermoplastic polyurethane;
extruding the molten thermoplastic polyurethane through a die onto a third substrate;
passing at least the third substrate and the extruded molten thermoplastic polyurethane through a nip to provide a layer of thermoplastic polyurethane on the third substrate; and
solidifying the thermoplastic polyurethane; or step (a) comprises step (i) and step (b) comprises step (ii).

In some embodiments, steps (a) to (e) are carried out sequentially and/or consecutively.

In some embodiments, said multilayer protective film is transparent and/or colored. In some embodiments, the method further comprises sizing and shaping the multilayer protective film to conform to a surface of a vehicle body part.

In some embodiments, step (a) further comprises: coating an aqueous-based polyurethane dispersion onto a releasable carrier. In some embodiments, step (a) further comprises: coating a solvent-based polyurethane solution onto a releasable carrier.

In some embodiments, step (b) comprises: extruding the polycaprolactone-based thermoplastic polyurethane at an elevated temperature through a die to form the TPU layer.

In some embodiments, at least one of steps (a) or (b) comprises step (i). In some embodiments, step (b) comprises step (ii).

In some embodiments, step (d) comprises: laminating the one major surface of the PU layer to the one major surface of the TPU layer while the one major surface of the TPU layer is at an elevated temperature that is sufficiently higher than room temperature to facilitate adequate bonding between the PU layer and the TPU layer.

In some embodiments, step (d) comprises: laminating one major surface of the PU layer to one major surface of the TPU layer after said extruding and with at least the one major surface of the PU layer and the TPU layer being at a temperature that is too low to facilitate adequate bonding between the PU layer and the TPU layer; and heating the one major surface of the TPU layer to an elevated temperature that is sufficiently higher than room temperature to facilitate adequate bonding between the PU layer and the TPU layer during said laminating, wherein said heating occurs before or during said laminating.

In some embodiments, the method further comprises corona treating the opposite major surface of the TPU layer. In some of these embodiments, the method further comprises: releasably laminating an opposite major surface of the TPU layer to a releasable carrier web after said extruding. In some of these embodiments, the method further comprises: exposing the opposite major surface of the TPU layer, after said releasably laminating; and corona treating the opposite major surface of the TPU layer, after said exposing and before said bonding the PSA layer.

In some embodiments, said at least partially crosslinked polyurethane is the reaction product of a polyol and at least a diisocyanate, and said polyol is a polyester polyol, a polycarbonate polyol or a combination of both. In some of these embodiments, said polyol is an aliphatic polyol. In some of these embodiments, said at least one polyisocyanate comprises a diisocyanate and a triisocyanate. In some of these embodiments, said triisocyanate is an aliphatic triisocyanate. In some of these embodiments, the said diisocyanate is an aliphatic diisocyanate (for example, isophorone diisocyanate and/or bis(4-isocyanatocyclohexyl)methane). In some embodiments, said at least partially crosslinked polyurethane comprises said polycarbonate-based polyurethane and/or said polyester-based polyurethane.

In some embodiments, said at least partially crosslinked polyurethane is a combination of said polyester-based polyurethane and said polycarbonate-based polyurethane. In some embodiments, said polyurethane is an aliphatic polyurethane. In some embodiments, said at least partially crosslinked polyurethane is a slightly crosslinked polyurethane. In some embodiments, said at least partially crosslinked polyurethane comprises a water-based polyurethane and/or a solvent-based polyurethane.

In some embodiments, said PU layer has an exposed major surface with the appearance of having been cast onto a smooth major surface of a releasable carrier web, dried and the carrier web removed. In some embodiments, the opposite major surface of said TPU layer is corona treated. In some embodiments, said pressure sensitive adhesive is tacky at room temperature.

Multilayer protective films made according to the present invention are useful, for example, as paint protection films.

As used herein:

the term "polyisocyanate" refers to an organic isocyanate having at least two isocyanate groups (for example, a diisocyanate, triisocyanate, etc.); and the term "polyol" refers to an alcohol having at least two hydroxyl groups (for example, a diol, triol, etc.).

Other features and advantages of the present invention will be apparent from the following description of embodiments thereof, and from the claims.

DETAILED DESCRIPTION

Although the present invention is herein described in terms of specific embodiments, it will be readily apparent to those skilled in this art that various modifications, rearrangements, and substitutions may be made without departing from the spirit of the invention.

A multilayer protective film, made according to the present invention, comprises a first or PU layer, a second or TPU layer and a PSA layer. The polyurethane comprises at least one of a polyester-based polyurethane or a polycarbonate-based polyurethane (for example, a combination of a polyester-based polyurethane or a polycarbonate-based polyurethane).

Figure 1:
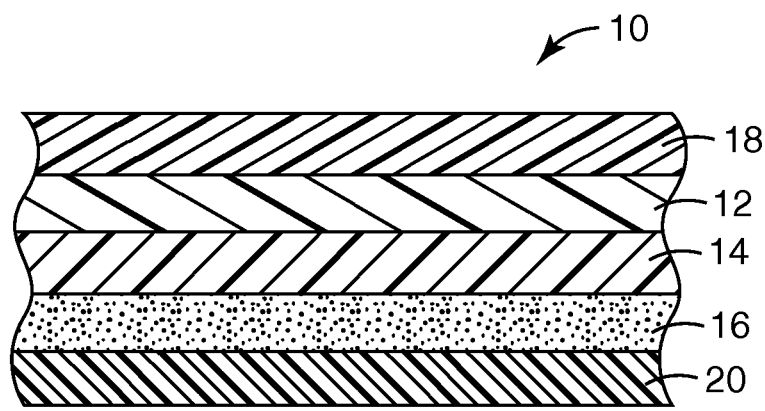
FIG. 1 a cross-sectional view of one multilayer film prepared according to an exemplary method of the present invention.

Referring now to FIG. 1, an exemplary multilayer film 10 made in accordance with the principles of the present invention includes at least a first or PU layer 12, a second or TPU layer 14 and a third or PSA layer 16. An optional releasable carrier web or liner 18 may be releasably bonded so as to protect the surface of the PU layer 12. It is typically desirable for the film 10 to also include another release liner 20 releasably bonded so as to protect the PSA layer 16.

In some embodiments, the PU layer consists of, consists primarily of, or at least comprises a solvent-based or water-based polyurethane. The water-based polyurethane may be made from an aqueous-based polyurethane dispersion (that is, PUD). The solvent-based polyurethane may be made from a solvent-based polyurethane solution (that is, PUS). In some cases, it may be desirable to use PUDs, because of the elimination of the volatile solvents typically associated with using PUSs.

In some embodiments, the PU layer consists of, consists primarily of, or at least comprises a polyurethane layer formed directly by polymerization of a layer comprising at least one polyisocyanate and at least one polyol (that is, RPU). Such a layer may be formed, for example, by either method (i) or method (ii) described hereinbelow. In some cases, it may be desirable to use RPUs, because of the elimination of the volatile solvents and the energy required to dry PUDs and PUSs.

The TPU layer consists of, consists primarily of, or at least comprises a polycaprolactone-based TPU (that is, thermoplastic polyurethane).

The PSA layer comprises a pressure sensitive adhesive, and preferably one that is tacky at room temperature. The PU layer is bonded to one major surface of the TPU layer and the PSA layer is bonded to an opposite major surface of the TPU layer such that the TPU layer is sandwiched between the PU layer and the PSA layer.

Steps (i) and (ii) involve reaction of at least one polyol with at least one polyol. Useful polyols include, for example, polyester polyols, polycarbonate polyols, and combinations thereof.

Examples of suitable polyols include materials commercially available under the trade designation DESMOPHEN from Bayer Corporation (Pittsburgh, Pa.). The polyols can be polyester polyols (for example, DESMOPHEN 631A, 650A, 651A, 670A, 680, 110, and 1150); polyether polyols (for example, DESMOPHEN 550U, 1600U, 1900U, and 1950U); or acrylic polyols (for example, DEMOPHEN A160SN, A575, and A450BA/A); polycaprolactone polyols such as, for example, those caprolactone polyols available under the trade designation TONE from Dow Chemical Co. (Midland Mich.) (for example, TONE 200, 201, 230, 2221, 2224, 301, 305, and 310) or under the trade designation CAPA from Solvay (Warrington, Cheshire, United Kingdom) (for example, CAPA 2043, 2054, 2100, 2121, 2200, 2201, 2200A, 2200D, 2100A, 3031, 3091, and 3051)); polycarbonate polyols (for example, those polycarbonate polyols available under the trade designations PC-1122, PC-1167, and PC-1733 from Picassian Polymers (Boston, Mass.) or under the trade designation DESMOPHEN 2020E from Bayer Corp.); and combinations thereof. The choice of the degree of reactive (for example, —OH) functionality (for example, difunctional) will generally be selected depending on the degree of crosslinking desired in the resultant polyurethane.

Examples of suitable polyisocyanates include: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl) diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, DESMODUR XP7100 and DESMODUR 3300) from Bayer Corporation (Pittsburgh, Pa.); and combinations thereof.

If cross-linking is desired (for example, in the case of a PU layer), one or more triisocyanates in combination with at least one diisocyanate in the reactive components used to make the PU layer, however this is not a requirement.

If substantially no-crosslinking is desired (for example, in the case of a TPU layer) the polyisocyanates and polyols are typically selected such that they are difunctional (that is, diisocyanate or diol), however a minor amount of cross-linking may be tolerable in some cases.

In general, the amount of polyisocyanate to polyol is selected in approximately stoichiometrically equivalent amounts, although other ratios may be used (for example, having excess polyisocyanate or excess polyol). Those skilled in the art will recognize that any excess isocyanate present after reaction with the polyol will typically react with materials having reactive hydrogens (for example, adventitious moisture, alcohols, amines, etc.).

A catalyst may be used to facilitate reaction between the polyol and the polyisocyanate. Urethane catalysts are well known in the art and include, for example, tin catalysts (for example, dibutyltin dilaurate).

In at least some cases, it may be desirable to use at least some (for example, use exclusively) aliphatic materials in construction the present multilayer film such as, for example, an aliphatic water-based polyurethane, an aliphatic polycaprolactone-based thermoplastic polyurethane, or a combination thereof. For example, in making the polyurethane, one or a combination of aliphatic polyols, aliphatic diisocyanates, and aliphatic triisocyanates may be used.

In at least some cases, it may be desirable for the present multilayer film to use a polyurethane that is at least a slightly crosslinked polyurethane but not a thermoset polyurethane. As used herein, a "slightly crosslinked polyurethane" is one that may exhibit at least enough melting, or at least enough softening, if heated to a sufficiently high temperature, to form a bond that is strong enough to pass the "Tape Snap Adhesion Test" if a layer of the polyurethane is laminated to a layer of the thermoplastic polyurethane. In contrast, as used herein, a "thermoset polyurethane" is one that is so heavily crosslinked that it does not exhibit a sufficient amount of melting or softening if heated. That is, a thermoset polyurethane will generally burn rather than melt or soften, and would not form a bond that is strong enough to pass the "Tape Snap Adhesion Test" if a layer of the thermoset polyurethane is laminated to a layer of the thermoplastic polyurethane, even if the thermoplastic polyurethane is heated before it is laminated.

The multilayer film may be easier to apply if the PSA layer consists of, consists primarily of, or at least comprises a pressure sensitive adhesive that is tacky at room temperature (that is, around 75° F. (22-24° C.)).

For paint protection applications, the multilayer film is typically transparent or translucent. The multilayer film may be transparent, translucent, or even opaque for other surface protection or enhancement applications, as desired. For some applications, it may be desirable for the multilayer film to be colored. The multilayer film may be colored, for example, by including a pigment or other coloring agent in one or more of its layers.

If used as a paint protection film, it is typically desirable for the present multilayer film to be sized and shaped to conform to the surface to be protected, before the film is applied. Pre-sized and shaped pieces of the present multilayer film may be commercially desirable for protecting the painted surface of various body parts of a vehicle such as, for example, an automobile, aircraft, watercraft, snowmobile, truck, or train car, especially those portions of the vehicle body (for example, the leading edge of the front hood and other leading surfaces and/or rocker panels) that are exposed to such hazards as flying debris (for example, tar, sand, rocks, and/or insects).

Method of Making

A method of making a multilayer protective film, according to the present invention comprises: (a) forming a first or PU layer; (b) forming a second or TPU layer; (c) forming a PSA layer; (d) bonding one major surface of the PUD layer to one major surface of the TPU layer; and (e) bonding the PSA layer (for example, by corona treating and thermally laminating, coating or otherwise applying the pressure sensitive adhesive so as to adhere) to an opposite major surface of the TPU layer, with the TPU layer being sandwiched between the PU layer and the PSA layer. At least one of steps (a) or (b) comprises step (i), step (b) comprises step (ii), or step (a) comprises step (i) and step (b) comprises step (ii).

The PU layer may consist of, consist primarily of, or at least comprise a polyurethane made from an aqueous-based polyurethane dispersion (that is, PUD) or a polyurethane made from a solvent-based polyurethane solution. The polyurethane may be a polyester-based polyurethane, a polycarbonate-based polyurethane or a combination of both. The TPU layer consists of, consists primarily of or at least comprises a polycaprolactone-based TPU (that is, thermoplastic polyurethane). The PSA layer comprises a pressure sensitive adhesive, and preferably one that is at least somewhat tacky at room temperature.

In the practice of the method of the present invention, the PU layer may be formed using conventional practices such as, for example, by the aqueous dispersion or solvent solution mixture being cast or otherwise coated onto a releasable carrier web or liner. Those skilled in the art are capable of casting or otherwise coating the aqueous dispersion or solvent solution mixture of the present invention onto a releasable carrier web using known techniques. Suitable carriers may include films such as biaxially oriented polyester and papers that may be coated or printed with a composition that will enable release from the polyurethane compositions. Such coatings include those formed from polyacrylics, silicone, and fluorochemicals. The aqueous dispersion or solvent solution mixture may be coated onto a carrier web using conventional equipment known by those skilled in the art such as knife coater, roll coaters, reverse roll coaters, notched bar coaters, curtain coaters, roto-gravure coaters, rotary printer and the like. The viscosity of the aqueous or solvent mixture may be adjusted to the type of coater used. The water or solvent in the coated mixture is then removed such as, for example, by drying.

The PU layer may be formed, for example, by casting or otherwise coating an aqueous PUD (that is, polyurethane dispersion) or solvent PUS (that is, polyurethane solution) onto a readily releasable carrier web or liner (for example, a polyester carrier web) having a smooth surface. By using such a carrier web or liner having a smooth surface on which to apply the aqueous PUD or solvent PUS, the resulting PU layer may exhibit an exposed major surface with the appearance of having been cast onto a smooth major surface of a releasable carrier web or liner, dried or otherwise cured and the carrier web removed. In contrast, if the PU layer is open air dried or cured such as, for example, by casting or coating the PU layer onto the one major surface of the TPU layer, then the exposed major surface of the PU layer would not exhibit the same smooth appearance.

The TPU layer may be formed by extruding the polycaprolactone-based TPU (that is, thermoplastic polyurethane) at an elevated temperature through an extrusion die. The TPU layer may also be formed by casting or otherwise molding (for example, injection molding) the polycaprolactone-based TPU into the shape desired.

The PU and TPU layers may be bonded together, for example by laminating the layers at an elevated temperature and pressure. For example, one major surface of the PU layer may be cold laminated under pressure to one major surface of the extruded TPU layer, while at least the one major surface of the TPU layer is, or both the TPU layer and the PU layer are, at an elevated temperature that is sufficiently high enough to facilitate adequate bonding between the PU layer and the TPU layer. As used herein, "cold laminating" refers to the layers being laminated together between two nip surfaces in about a room or ambient temperature environment (that is, the layers are not kept in an intentionally heated environment during the laminating process). The nip surfaces may be two nip rollers, a stationary nip surface (for example, a low friction surface of a flat or curved plate) and a nip roller, or two stationary nip surfaces. The laminating process may even be performed in a below ambient temperature environment (that is, the layers are intentionally cooled during the laminating process). For example, one or both of the nip surfaces may be chilled to a temperature below ambient, in order to cool the exposed major surfaces of the polyurethane layers (that is, the major surfaces the nip surfaces contact). The use of such chilled surfaces may eliminate, or at least help reduce, warping of the layers resulting from the laminating process. At the same time, the major surfaces that make contact at the interface between the polyurethane layers remain at the elevated temperature long enough to be sufficiently bonded together by the laminating pressure exerted by the nip surfaces. Such cold laminating may be accomplished by laminating the newly extruded TPU layer directly onto a preformed PU layer, while the TPU material still retains significant heat from the extrusion process. The PU layer is typically still releasably bonded to the carrier web or liner, to provide additional structural strength.

Alternatively, one major surface of the PU layer may also be bonded to one major surface of the extruded TPU layer by using a hot laminating process. With this process, the initial temperature of both the PU layer and the TPU layer is about room temperature or at least a temperature that is too low to facilitate adequate bonding between the PU layer and the TPU layer. Then, at least the one major surface of the TPU layer, at least the one major surface of the PU layer, or the one major surfaces of both the PU layer and the TPU layer are heated to an elevated temperature that is sufficiently higher than room temperature to facilitate adequate bonding between the PU layer and the TPU layer under the laminating pressure. With the hot laminating process, the layers are heated before or during the application of the laminating pressure. If a hot laminating process is used, a major surface of the TPU layer is typically releasably laminated to a readily releasable carrier web or liner (for example, a polyester carrier web) directly after the TPU layer is extruded, in order to provide the freshly extruded TPU layer with additional structural support.

Acceptable minimum temperatures and pressures for bonding the layers together, using either the cold or hot laminating process, have included a temperature of at least about 200° F. (93° C.) and a pressure of at least about 15 lb/in$^2$ or psi (10.3 N/cm$^2$).

To facilitate or at least improve bonding between the TPU layer and the PSA layer it may be desirable to corona treat (for example, air or N$_2$ corona treatment) and thermally laminate the major surface of the extruded TPU layer to be bonded to the PSA layer. To accomplish this, the major surface of the TPU layer, which is not in contact with the PU layer, is exposed and then corona treated. If a hot laminating process is used (that is, the TPU layer is extruded onto a releasable carrier web or liner), the carrier web or liner must first be stripped off of the TPU layer.

As discussed above, at least one of steps (a) or (b) comprises step (i), step (b) comprises step (ii), or step (a) comprises step (i) and step (b) comprises step (ii).

Step (i) comprises forming a rolling bank of a polyurethane precursor material comprising at least one polyisocyanate and at least one polyol, wherein the rolling bank contacts first and second substrates; passing the first and second substrates with the polyurethane precursor material disposed therebetween through a nip; heating the polyurethane precursor material under conditions such that it forms the PU layer in contact with the first and second substrates; and optionally removing at least one of the first or second substrates from the PU layer to expose an outer surface of the PU layer.

Figure 2:
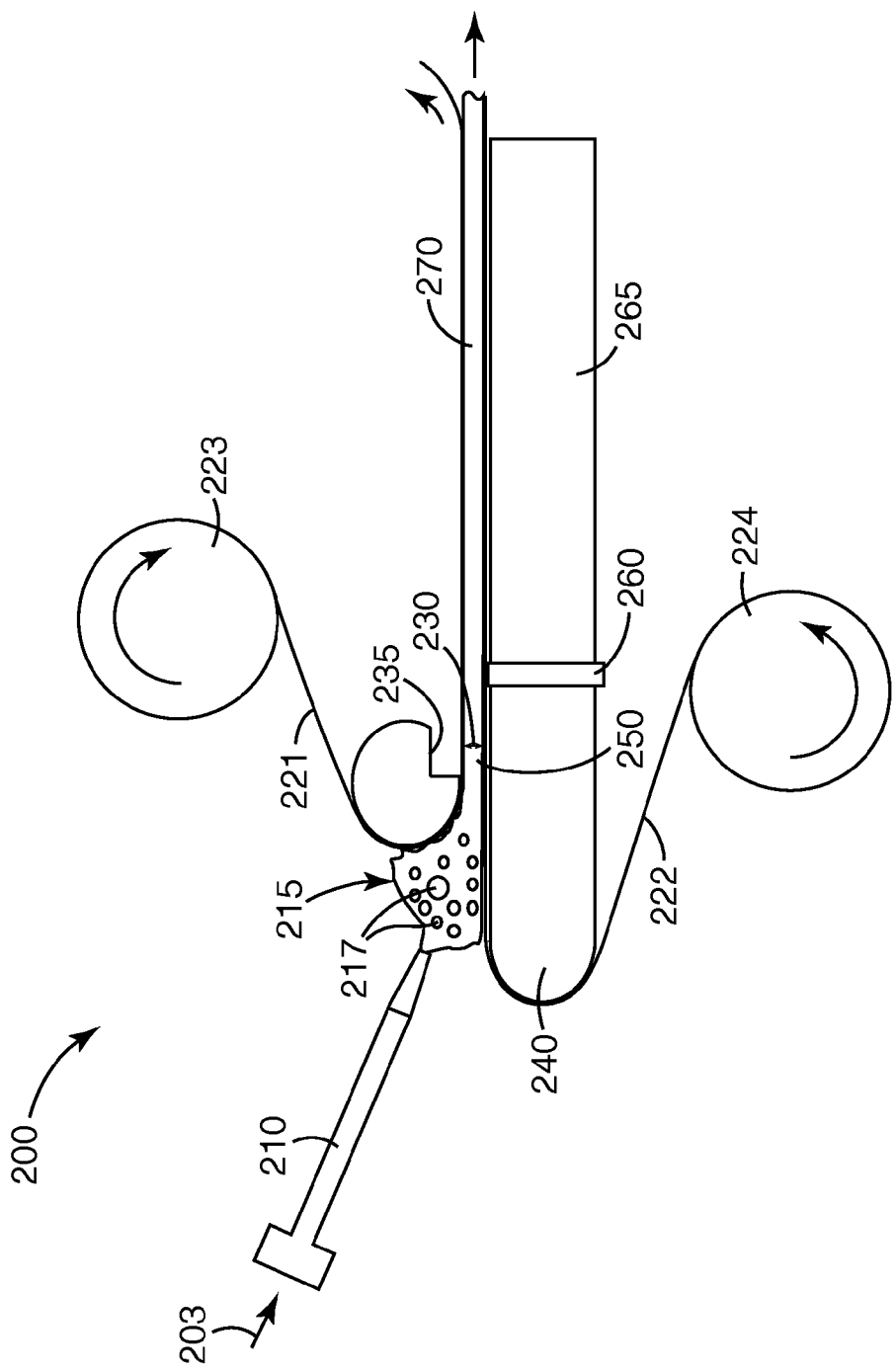
FIG. 2 is a schematic depiction of an exemplary reactive coating process corresponding to step (i) of the method of the present invention.

An exemplary process 200 for step (i) is shown in FIG. 2. Referring now to FIG. 2, reactive component(s) 203 is/are fed into static mixer 210. The mixed component(s) are then fed to form rolling bank 215 which is disposed ahead of and between first and second substrates 221, 222 which are unwound from feed rolls 223, 224. As first and second substrates 221, 222 advance through nip 230 formed by first platen 240 and notch bar 235 entrapped air bubbles 217 are substantially or completely removed to give layer 250 which, after passing optional insulation barrier 260, contacts optional heated platen 265 which facilitates polymerization of the reactive component(s), if desired, to form a layer 270 disposed between first and second substrates 221, 222. In this regard, it will be recognized that although a heated platen is shown in FIG. 2, any heating means may be used including, for example, infrared lamps, ovens, microwave radiation, and heated platens. Layer 270 may correspond to the PU layer or the TPU layer depending on the degree of cross-linking (for example, due to the inclusion of polyisocyanates having an average functionality of greater than two).

In some embodiments, (for example, those wherein at least the first substrate is a release liner) first substrate 221 is then removed to expose a surface of layer 270 to which additional layers may be laminated, or on which subsequent layers may be provided.

Advantageously, by using the above-described coating process it is generally possible to produce coated layers of material that are substantially void-free (that is, free of bubbles or pinhole coating defects that are readily visible to an unaided human eye) over relatively large areas (for example, greater than 1 square meter).

In general, the effectiveness of entrapped air removal will vary with the materials and conditions used, but typically a gap of 20 mils (0.51 mm) or less (for example, less than or equal to 15 mils (0.38 mm), 10 mils (0.25 mm), 8 mils (0.20 mm), or even less than or equal to 5 mils (0.17)) may be effective. The gap may be created by any suitable means including, for example, nip roll(s), bars, platen(s), knife edge(s), or a combination thereof. Multiple nips (for example, of decreasing gap) may also be used.

The reactive components (for example, polyol and polyisocyanate) should typically be fed at a sufficient rate such that the rolling bank is not depleted.

In general, the first and second release substrates should have the same rate of travel, however this is not a requirement. In some embodiments, the first substrate and/or second may be in the form of a continuous belt. In some embodiments, the first and second substrates may comprise, for example, a mold or a release liner.

Examples of suitable release liners include: paper, polymer film (for example, polyester, polyethylene, or polypropylene), or other polymeric film material. The release liner may be coated with a material to decrease the amount of adhesion between the release liner and the adhesive layer. Such coatings can include, for example, a silicone or fluorochemical material. Any commercially available release liner may be used in the present invention.

The first and/or second substrate may comprise a release liner, the PU layer, the TPU layer, the PSA layer, or a combination thereof, as desired. For example, in one exemplary embodiment, second substrate 222 may comprise a release liner having a TPU layer thereon, wherein step (i) provides a PU layer on the TPU layer. In another exemplary embodiment, second substrate 222 may comprise a release liner having a PSA layer thereon, wherein step (i) provides a TPU layer on the PSA layer. In yet another exemplary embodiment, second substrate 222 may comprise a release liner having a PSA thereon and a TPU layer on the PSA layer opposite the release liner.

If using method (i) to prepare the PU layer, at least one polyisocyanate and/or at least one polyol should typically have an average reactive functionality (for example, —NCO or —OH functionality) of greater than two, although this is not a requirement (for example, if a minor amount of trifunctional amine or aminoalcohol is included with the polyol).

If using method (i) to prepare the TPU layer, the polyisocyanates and polyols should typically have an average reactive functionality (for example, —NCO or —OH functionality) of two or less, although this is not a requirement (for example, if a minor amount of crosslinking is acceptable).

Step (ii) comprises introducing components comprising a diisocyanate and a diol into an extruder to provide a molten thermoplastic polyurethane; extruding the molten thermoplastic polyurethane through a die onto a third substrate; passing at least the third substrate and the extruded molten thermoplastic polyurethane through a nip to provide a layer of thermoplastic polyurethane on a substrate; and solidifying the thermoplastic polyurethane. Solidification of the extruded molten polyurethane may occur contemporaneously with, or subsequent to, forming the polyurethane layer.

Figure 3:
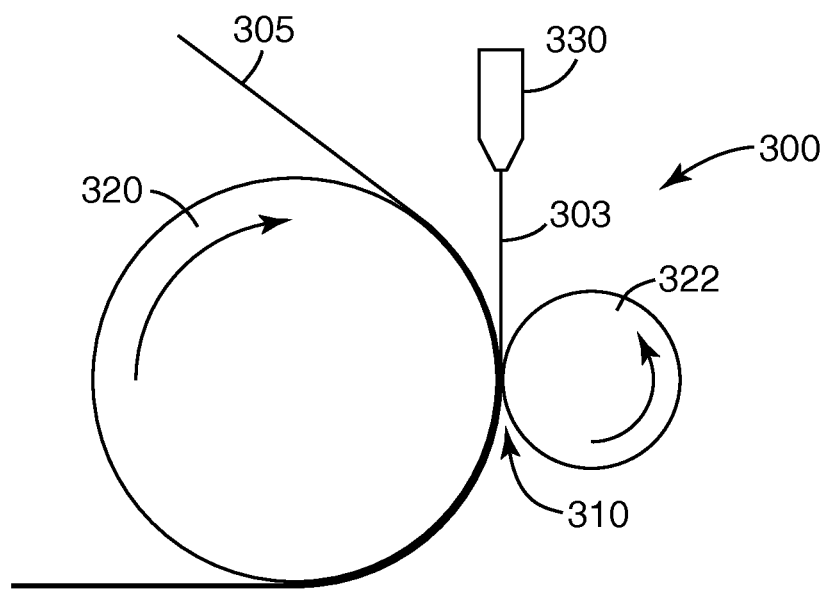
FIG. 3 is a schematic depiction of an exemplary reactive extrusion process corresponding to step (ii) of the method of the present invention.

Typically, the polyisocyanate(s) and polyol(s) are introduced simultaneously into the bore of the extruder, however, they may be introduced sequentially. As the polyisocyanate(s) and polyol(s) move through the extruder, typically with heating, they react with one another to form a thermoplastic polyurethane (TPU), which is extruded through a melt die to form the TPU layer. In some cases, additional polymerization may occur after extrusion. The thermoplastic polyurethane is extruded from melt die 330 onto a substrate to form the TPU layer. Referring now to FIG. 3, which shows an exemplary process 300 for step (ii), molten thermoplastic polyurethane 303 is extruded onto substrate 305 at nip 310, which is formed by rolls 320, 322.

In general, the melt die is maintained at a temperature above the melting point of the polymer (for example, at least 20° C. above the melting point).

The substrate may comprise a release liner, the PU layer, the PSA layer, or a combination thereof, as desired. For example, in one exemplary embodiment, substrate 305 may comprise a release liner having a PU layer thereon, wherein step (ii) provides a TPU layer on the PU layer. In another exemplary embodiment, substrate 305 may comprise a release liner having a PSA layer thereon, wherein step (ii) provides a TPU layer on the PSA layer.

If the raw materials used in either steps (i) or (ii) are solids or semi-solids, they may be heated to a fluid state before handling (for example, mixing or pumping) them.

Further details concerning multilayer polyurethane films and methods for making and using them may be found, for example, in PCT Pat. Appln. US2006/015699 (Ho et al.), filed Apr. 26, 2006, the disclosure of which is hereby incorporated herein by reference in its entirety.

EXAMPLES

Test Methods
Tape Snap Adhesion Test

This test provides an indication of how well a film construction remains together after exposure to various conditions. Sample of the pressure-sensitive adhesive coated polyurethane construction are adhered to painted panels and aged for 24 hours at room temperature. Separate panels are aged using each of the test conditions listed below:

Water Immersion (10 D-WI): panel immersed in 40° C. water bath for 10 days;
Fog chamber (7 D-100/100): panel aged on a rack at about 30 degree angle and exposed for 7 days at 38° C. in a chamber with 100% relative humidity;
Salt spray (7 D-SS): panel placed on a rack at about 60 degree angle and exposed for 7 days at 35° C. using a 5 percent by weight sodium chloride solution in a salt fog chamber; and
Heat aging (7 D-80 C): panel placed on a rack for 7 days in an oven set at 80° C. oven.

After aging, the test panel is dried if needed, and then conditioned at room temperature (about 22° C.) for 24 hours. The construction is then cross-hatched with a razor blade to form a grid of about 20 squares each measuring about 1 mm by 1 mm. A strip of 610 Tape (available from 3M Company (St. Paul, Minn.)) is adhered over the cross-hatched area using firm finger pressure, and then the tape is snapped off with a quick pull. The sample is rated as Pass (no delamination of any squares the film or blistering of the film is observed after tape is removed) or Fail (at least one square is removed with the tape or blistering is observed after drying).

The color change in the films before and after aging is also measured. The film color change is measured according to the standard procedure detailed in ASTM D2244-05 "Standard Practice for Calculation of Color Tolerances and Color Differences from Instrumentally Measured Color Coordinates" using a CHROMA SENSOR CS-5 instrument from Data Color International (Lawrenceville, N.J.). Delta E ($\Delta$E) represents the total color change in the film before and after aging in different environments. Delta YI (($\Delta$YI) represents the yellowness index change before and after filmed aged in different environments.

Gravel Test

The gravel test is conducted according to ASTM D3170-03 "Standard Test Method for Chipping Resistance of Coatings". A 4-inch by 4-inch square film sample is applied to a clear coated steel panel coated with a white clearcoat/ basecoat paint system. The panel with film is then conditioned at −30° C. for at least 3 hours. The panel is mounted vertically and exposed to the impact force of 780 grams of gravel at a pressure of 60 psi (0.4 MPa). The panel with film is then aged for 7 days in salt spray environment for corrosion test.

Materials Used In The Examples

Ky.)). The extruder had 10 barrel zones that were independently heated. A melt pump was used at the output end of the twin screw extruder to feed the melt into a 25.4-cm (10-inch) wide coat hanger die (available from Extrusion Dies, Inc. (Chippewa Falls, Wis.). The die had a 1.27-mm (0.050-inch) die opening with an adjustable lip. The extrusion process conditions are reported in Table 1 (below).

| ABBREVIATION | DESCRIPTION |
|---|---|
| U933 | water-based, polycarbonate-based polyurethane dispersion available under the trade designation U933 from Alberdingk Boley, Inc. (Charlotte, NC) |
| AMP-95 | aminomethylpropanol pH adjuster available under the trade designation AMP-95 from Angus Chemical Co. (Buffalo Grove, IL) |
| DABCO T-12 | dibutyltin dilaurate available under the trade designation DABCO T-12 from Air Products and Chemicals, Inc. (Allentown, PA) |
| DESMODUR N3300 | aliphatic isocyanate available under the trade designation DESMODUR N3300 from Bayer, Inc., Material Science, LLC (Pittsburgh, PA) |
| DESMODUR W | dicyclohexylmethane diisocyanate available under the trade designation DESMODUR W from Bayer MaterialScience LLC (Pittsburgh, PA) |
| K-FLEX 188 | polyester polyol available under the trade designation K-FLEX 188 from King Industries, Inc. (Norwalk, CT) |
| NEOCRYL CX100 | aziridine crosslinker available under the trade designation NEOCRYL CX100 from DSM (Waalwijk, The Netherlands) |
| POLY BD R20LM | low molecular weight hydroxy terminated polybutadiene available under the trade designation POLY BD R20LM from Sartomer Co. (Exton, PA) |
| TECOFLEX CLA 93A-V | thermoplastic caprolactone-based polyurethane available under the trade designation TECOFLEX CLA 93A-V from Noveon, Inc. (Cleveland OH) |
| TINUVIN 123 | hindered amine light stabilizer based on aminoether functionality available under the trade designation TINUVIN 123 from Ciba Specialty Chemicals Corp. (Tarrytown, NY) |
| TINUVIN 292 | liquid hindered amine light stabilizer available under the trade designation TINUVIN 292 from Ciba Specialty Chemicals Corp. |
| TINUVIN 1130 | hydroxyphenylbenzotriazole type UV absorber available under the trade designation TINUVIN 1130 from Ciba Specialty Chemicals Corp. |
| TONE 2221 | linear polycaprolactone polyol having a number average molecular weight of 2000, a functionality of 2, hydroxyl number (mg KOH/g) of 56.1, and a hydroxyl equivalent weight of 1000 g/eq, available under the trade designation TONE 2221 from Dow Chemical Co. (Midland MI) |
| TONE 2241 | linear polycaprolactone polyol having a number average molecular weight of 1000, a functionality of 2, hydroxyl number (mg KOH/g) of 112.2, and a hydroxyl equivalent weight of 500 g/eq, available under the trade designation TONE 2241 from Dow Chemical Co. |
| TRITON GR-7M | sulfosuccinate type anionic surfactant available under the trade designation TRITON GR-7M from Dow Chemical Co. |
| TYZOR DC | bis(ethyl acetoacetato)diisopropoxytitanium available under the trade designation TYZOR DC from E. I. du Pont de Nemours & Co. (Wilmington, DE) |

1,4-Butanediol is commercially available, for example, from International Specialty Products (Wayne, N.J.). Butyl carbitol is commercially available, for example, from Eastman Chemical Co. (Kingsport, Tenn.). 2-Ethylhexyl 2-cyano-3,3-diphenylacrylate, a UV light absorber, is commercially available, for example, from Aldrich Chemical Co. (Milwaukee, Wis.).

Example 1

A polyurethane film was prepared by reactively extruding a two part polyurethane composition through a 25-mm co-rotating twin screw extruder (Berstorff model ZE25 twin screw extruder available from Berstorff USA (Florence,

TABLE 1

| Process Condition | Setting |
|---|---|
| Extruder RPM (rpm) | 75 |
| Extruder Amps (amps) | 10 |
| Zone 2 (° C.) | 160 |
| Zone 3 (° C.) | 165 |
| Zone 4 (° C.) | 170 |
| Zone 5 (° C.) | 170 |
| Zone 6 (° C.) | 180 |
| Zone 7 (° C.) | 180 |
| Zone 8 (° C.) | 180 |
| Zone 9 (° C.) | 180 |
| Zone 10 (° C.) | 180 |
| Die Zone (° C.) | 185 |

TABLE 1-continued

| Process Condition | Setting |
| --- | --- |
| Melt Temp (° C.) | 97 |
| Neck Tube (° C.) | 185 |
| Block Heater (° C.) | 185 |
| Chill Roll (° C.) | 16 |
| Melt Pump RPM (rpm) | 21 |
| Melt Pump pressure in (psi) | 30 |
| Melt Pump pressure out (psi) | 470 |

Part A (polyol mixture) and Part B (isocyanate) of the compositions reported in Table 2 (below) were simultaneously fed into zone 2. Part A was heated to about 55° C. in an electrically heated vessel and fed into the extruder with a gear pump (available from Zenith Pumps, Monroe, N.C.) at a flow rate of 67.83 grams/minute, and Part B was fed into the extruder using piston pump (Gilson 100SC HPLC piston pump available from Gilson Inc, Middleton, Wis.) at a flow rate of 45.68 grams/minute.

TABLE 2

PART A POLYOL FORMULATIONS

| | Example 1 | Example 2 |
| --- | --- | --- |
| TONE 2221 polyol | 3703.7 | 1240.6 |
| TONE 2241 polyol | 0 | 2394.9 |
| 1,4-butanediol | 704.4 | 772.6 |
| 2-ethylhexyl 2-cyano-3,3-diphenylacrylate | 45.4 | 45.4 |
| Tinuvin-292 | 45.4 | 45.4 |
| 10 weight percent DABCO T-12 in TONE 2221 | 45.4 | 45.4 |

The extrudate from the die was cast as a film having nominal thickness of 0.15 mm (6 mils) onto a clear coat film disposed on a release coated polyester carrier web moving at a winder speed of about 1.5 meters/min (5 ft/min)

The clear coat film was prepared from an aqueous polyurethane coating dispersion by mixing 83.78 grams of U933 dispersion and an antioxidant dispersion. The dispersion was prepared by mixing 0.03 grams of AMP-95, 0.19 grams Triton GR-7M, 8.47 grams of butyl carbitol, 1.08 grams of 2-ethylhexyl 2-cyano-3,3-diphenylacrylate, and 0.45 grams TINUVIN 123 and diluting with de-ionized water to maintain the viscosity between 70 cps (70 mPa-sec) and 180 cps (180 mPa-sec). Just prior to coating, 1.30 percent by weight of a crosslinker (50 percent by weight solids NEOCRYL-100 in deionized water) were added under agitation. The dispersion was coated to a thickness of about 50 micrometers onto an untreated polyester carrier web. The coated dispersion was dried and cured sequentially in separate ovens for about 0.5 minutes each. The oven temperatures were set at 121° C., 149° C., and 163° C. for the first, second, and third ovens, respectively. The resulting clear film was about 11-12 microns thick.

After the laminate was cooled, the exposed side of the extruded polyurethane film was corona treated at 2 kilowatts and thermally laminated to an acrylic pressure-sensitive adhesive on a paper release liner using a hot can set at 121° C. (250° F.) to form a polyurethane construction. The polyester carrier was removed and the polyurethane construction was tested for environmental aging followed by tape snap adhesion test, and gravel tests. The results are summarized in Table 3.

Comparative Example C1

Comparative Example C1 was multilayer film prepared according to Example 1 of PCT Pat. Appln. No. US2006/015699 (Ho et al.), filed Apr. 26, 2005.

TABLE 3

| | Example 1 | | | Comparative Example C1 | | |
| --- | --- | --- | --- | --- | --- | --- |
| Test Condition | Adhesion Pass/Fail | ΔE | ΔYI | Adhesion Pass/Fail | ΔE | ΔYI |
| TAPE SNAP ADHESION TEST | | | | | | |
| 10 D- WI | Pass | 0.26 | 0.46 | Pass | 0.28 | 0.5 |
| 7 D 100/100 | Pass | 0.18 | 0.16 | Pass | 0.15 | −0.08 |
| 7 D - SS | Pass | 0.21 | −0.63 | Pass | 0.17 | −0.05 |
| 7 D - 80 C. | Pass | 0.72 | 1.12 | Pass | 0.62 | 1.05 |
| GRAVEL TEST | | | | | | |
| | Pass | No Rust or Puncture | | Pass | No Rust or Puncture | |

Example 2

A polyurethane film was prepared according to the procedure outlined in Example 1, except that the Composition for Example 2 was used, and Part A was fed into the extruder at a flow rate of 68.70 grams/minute and Part B was fed into the extruder at a flow rate of 44.70 grams/minute. The extrudate was cast at a thickness of 0.15 mm (6 mil) onto a clear coat film disposed on a polyester carrier to form a polyurethane construction. The clear coated liner used was prepared according to the procedure of Example 1 of U.S. Pat. No. 6,607,831 (Ho et al.).

Example 3

A 2-part polyurethane composition was prepared by mixing 6 grams of DESMODUR N3300 with 7.6 grams K-FLEX 188 polyol and 2 drops of dibutyltin dilaurate. All amounts were in parts by weight. Two substrates were positioned between a slotted knife and a platen with a gap of about 0.15 mm (6 mils) between the two substrates. The composition is fed between the substrates to form a rolling bank just in front of the slotted knife. The substrates were pulled downweb through the knife and a film coating was formed between them. The coating thickness was approximately 127 micrometers (5 mils). The bottom substrate was a 0.30 mm (12 mil) thick sheet of thermoplastic polyurethane made from TECOFLEX CLA 93A-V. The bottom substrate was also coated with a pressure sensitive adhesive which was protected by a silicone coated release liner. The top substrate was a silicone release coated polyester film. The coating was allowed to polymerize at room temperature on a flat surface over the course of several days to form a polyurethane construction suitable for a paint protection film.

Examples 4-9

A clear coat dispersion was prepared by mixing 92.35 parts of U933, 4.44 parts of a polyaziridine solution (50 parts of NEOCRYL CX100 in 50 parts deionized water), and 3.21 parts of an antioxidant emulsion (1.62 parts of water, 0.49 part TINUVIN 292, 0.83 part TINUVIN 1130, 0.18 parts TRITON GR-7M, 0.09 part of AMP-95. The dispersion was coated onto a smooth silicone coated 50.8 micrometers (2 mils) thick polyester film using a notched bar coater with a gap setting of 152.4 μm (6 mils) between the film and the bar coater. The coater speed was set at 1.52 mpm (5 feet/minute) and the film was dried and cured in a 3-zone oven with oven temperatures set at 79.4° C./140.6° C./198.9° C. (175° F./285° F./390° F.) to form a polyurethane film having a thickness of about 25.4 micrometers (1 mil). Each oven zone was about 3.66 m (12 feet) long. The resultant film (Film A) had a cross-linked polyurethane PU layer on a release liner.

Two-part polyurethane compositions having the formulations reported in Table 4 were prepared by mixing the reactive components K-FLEX 188, POLY BD R20LM, DESMODUR W, and a tin catalyst. The compositions were then coated at a thickness of about 5 mils (130 micrometers) according to the procedure of Example 3, except that the bottom substrate was a silicone release coated polyester film. The coating was allowed to polymerize at room temperature on a flat surface over the course of several days to form a polyurethane protective layer. The top silicone release coated polyester film was then removed from the polyurethane surface. The resultant films (Films B4-B9) had a thermoplastic polyurethane TPU layer on a release liner.

TABLE 4

THERMOPLASTIC FILM COMPOSITION

| Example | DESMODUR W, Grams | K-FLEX 188, grams | POLYBD R20LM, grams | dibutyltin dilaurate (drops) |
|---|---|---|---|---|
| 4 | 3 | 0.56 | 13.4 | 3 |
| 5 | 3 | 1.12 | 11.91 | 3 |
| 6 | 3 | 1.68 | 10.42 | 3 |
| 7 | 3 | 2.24 | 8.93 | 3 |
| 8 | 3 | 2.79 | 7.44 | 3 |
| 9 | 3 | 2.19 | 3.72 | 3 |

While not physically performed, it is believed that the PU layer of Film A could be successfully laminated to the TPU layer of any of Films B4-B9, and a pressure-sensitive adhesive PSA layer added to the laminate, to form a multilayer polyurethane protective film suitable for use, for example, as a paint protection film Example 10

A TPU layer between two silicone release coated polyester films was prepared as in Example 4, except using as the reactive components: 10 grams of POLYBD R20LM, 2 grams of DESMODUR W, 2 drops of TYZOR DC. The resultant construction was allowed to cure to completion over the course of several months, after which the TPU layer was tacky to the touch. One of the release liners was then removed from the TPU layer, which was then laminated to the PU layer of Film A from Example 4. The opposing release liner on the TPU layer was then removed, and an acrylic psa layer on a microstructured release liner was laminated to the surface of the TPU layer without any pretreatment. The liner from Film A was then removed, and a one inch wide sample of the resulting multilayer polyurethane protective film was cut into a length of 3 inches. The microstructured release liner was then removed from the psa layer, and the resultant construction was laminated to a painted metal panel.

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof.

We claim:

1. A method of making a multilayer protective film, the method comprising steps:
   (a) forming a PU layer comprising an at least partially crosslinked polyurethane;
   (b) forming a TPU layer comprising a thermoplastic polyurethane;
   (c) forming a PSA layer comprising a pressure sensitive adhesive;
   (d) bonding one major surface of the PU layer to one major surface of the TPU layer; and
   (e) bonding the PSA layer to an opposite major surface of the TPU layer; wherein the TPU layer is sandwiched between the PU layer and the PSA layer, and wherein at least one of steps (a) or (b) comprises step:
      (i) forming a rolling bank of a polyurethane precursor material, wherein the rolling bank contacts first and second substrates;
         passing the first and second substrates with the polyurethane precursor material disposed therebetween through a nip;
         heating the polyurethane precursor material under conditions such that it forms the PU layer or the TPU layer in contact with the first and second substrates; and
         optionally removing at least one of the first or second substrates from the PU layer or the TPU layer to expose an outer surface of the PU layer or the TPU layer, respectively; or
   step (b) comprises step:
      (ii) introducing components into an extruder to provide a molten thermoplastic polyurethane;
         extruding the molten thermoplastic polyurethane through a die onto a third substrate;
         passing at least the third substrate and the extruded molten thermoplastic polyurethane through a nip to provide a layer of thermoplastic polyurethane on the third substrate; and
         solidifying the thermoplastic polyurethane; or
   step (a) comprises step (i) and step (b) comprises step (ii).

2. The method of claim 1, wherein steps (a) to (e) are carried out sequentially.

3. The method of claim 1, wherein steps (a) to (e) are carried out consecutively.

4. The method of claim 1, wherein the at least partially crosslinked polyurethane comprises at least one of a polyester-based polyurethane and a polycarbonate-based polyurethane.

5. The method of claim 1, wherein step (a) further comprises:
   coating an aqueous-based polyurethane dispersion onto a releasable carrier.

6. The method of claim 1, wherein step (a) further comprises:
   coating a solvent-based polyurethane solution onto a releasable carrier.

7. The method of claim 1, wherein the TPU layer comprises a polycaprolactone-based thermoplastic polyurethane.

8. The method of claim 1, wherein step (b) comprises:
   extruding the polycaprolactone-based thermoplastic polyurethane at an elevated temperature through a die to form the TPU layer.

9. The method of claim 8, wherein at least one of steps (a) or (b) comprises step (i).

10. The method of claim 8, wherein step (b) comprises step (ii).

11. The method of claim 10, wherein the components introduced into an extruder to provide a molten thermoplastic polyurethane in step (ii) comprise a diisocyanate and a diol.

12. The method of claim 1, wherein the components introduced into an extruder to provide a molten thermoplastic polyurethane in step (ii) comprise a diisocyanate and a diol.

13. The method of claim 1, wherein step (a) comprises step (i).

14. The method of claim 13, wherein the rolling bank of the polyurethane precursor material comprises at least one polyisocyanate and at least one polyol.

15. The method of claim 1, wherein step (b) comprises step (i).

16. The method of claim 15, wherein the rolling bank of the polyurethane precursor material comprises at least one polyisocyanate and at least one polyol.

17. The method of claim 8, wherein step (d) comprises:
laminating the one major surface of the PU layer to the one major surface of the TPU layer while the one major surface of the TPU layer is at an elevated temperature that is sufficiently higher than room temperature to facilitate adequate bonding between the PU layer and the TPU layer.

18. The method of claim 8, wherein step (d) comprises:
laminating one major surface of the PU layer to one major surface of the TPU layer after said extruding and with at least the one major surface of the PU layer and the TPU layer being at a temperature that is too low to facilitate adequate bonding between the PU layer and the TPU layer; and
heating the one major surface of the TPU layer to an elevated temperature that is sufficiently higher than room temperature to facilitate adequate bonding between the PU layer and the TPU layer during said laminating,
wherein said heating occurs before or during said laminating.

19. The method of claim 1, further comprising:
corona treating the opposite major surface of the TPU layer.

20. The method of claim 19, further comprising:
releasably laminating an opposite major surface of the TPU layer to a releasable carrier web after said extruding.

21. The method of claim 20, further comprising:
exposing the opposite major surface of the TPU layer, after said releasably laminating; and
corona treating the opposite major surface of the TPU layer, after said exposing and before said bonding the PSA layer.

22. The method of claim 1, wherein said at least partially crosslinked polyurethane is the reaction product of a polyol and at least a diisocyanate, and said polyol is a polyester polyol, a polycarbonate polyol or a combination of both.

23. The method of claim 22, wherein said polyol is an aliphatic polyol.

24. The method of claim 1, wherein said at least partially crosslinked polyurethane is a water-based polyurethane.

25. The method of claim 1, wherein said at least partially crosslinked polyurethane is a solvent-based polyurethane.

26. The method of claim 1, wherein said PU layer has an exposed major surface with the appearance of having been cast onto a smooth major surface of a releasable carrier web, dried and the carrier web removed.

27. The method of claim 1, wherein the opposite major surface of said TPU layer is corona treated.

\* \* \* \* \*

UNITED STATES PATENT AND TRADEMARK OFFICE
CERTIFICATE OF CORRECTION

PATENT NO. : 8,551,285 B2
APPLICATION NO. : 13/359131
DATED : October 8, 2013
INVENTOR(S) : Ho et al.

Page 1 of 1

It is certified that error appears in the above-identified patent and that said Letters Patent is hereby corrected as shown below:

In the Specification

Column 1
Line 7, Delete "Oct. 2, 2007," and insert -- Apr. 01, 2009, --, therefor.

Column 4
Line 35, Delete "DEMOPHEN" and insert -- DESMOPHEN --, therefor.

Column 13
Line 38, After "(5 ft/min)" insert -- . --.

Column 15
Line 29 (Approx.), Delete "grams)" and insert -- grams --, therefor.

Column 15
Line 42, After "film" insert -- . --.

Column 15
Line 56, Delete "psa" and insert -- PSA --, therefor.

Column 15
Line 62, Delete "psa" and insert -- PSA --, therefor.

Signed and Sealed this
Eighth Day of April, 2014

Michelle K. Lee
*Deputy Director of the United States Patent and Trademark Office*